(12) United States Patent
Kurland

(10) Patent No.: US 6,293,501 B1
(45) Date of Patent: Sep. 25, 2001

(54) SPACECRAFT MOMENTUM MANAGEMENT SYSTEM

(75) Inventor: Jeffrey A. Kurland, Marina Del Rey, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/306,076

(22) Filed: May 6, 1999

(51) Int. Cl.[7] ............................................... B64G 1/24
(52) U.S. Cl. .................... 244/164; 244/165; 244/171; 244/173
(58) Field of Search ............................. 244/158 R, 164, 244/165, 169, 171, 173; 701/13

(56) References Cited

U.S. PATENT DOCUMENTS

| | | | |
|---|---|---|---|
| 5,349,532 | * | 9/1994 | Tilley et al. ........................ 244/171 |
| 5,794,892 | * | 8/1998 | Salvatore ........................... 244/165 |
| 5,826,828 | * | 10/1998 | Fowell et al. ..................... 244/164 |
| 6,003,818 | * | 12/1999 | Shah et al. ........................ 244/165 |
| 6,021,979 | * | 2/2000 | Bender et al. .................... 244/164 |
| 6,076,773 | * | 6/2000 | Salvatore ........................... 244/164 |

* cited by examiner

Primary Examiner—Galen L. Barefoot

(57) ABSTRACT

A momentum control system for driving the momentum of a spinning spacecraft to zero while it spins around a sunline. The system includes a sun sensor for determining the position of the sun, a suite of tachometers for determining the momentum stored in the spacecraft, and a stored movement sensor. Each of the readings from these sensors is fed to a controller. The controller also monitors the magnitude of the spacecraft overturning momentum and the windmill momentum. If the overturning momentum is outside acceptable limits then the rotation rate of the spacecraft is modulated to drive the overturning momentum towards zero. If the windmill momentum exceeds acceptable limits, the angle of the solar panel is adjusted to drive the windmill momentum towards zero.

19 Claims, 2 Drawing Sheets

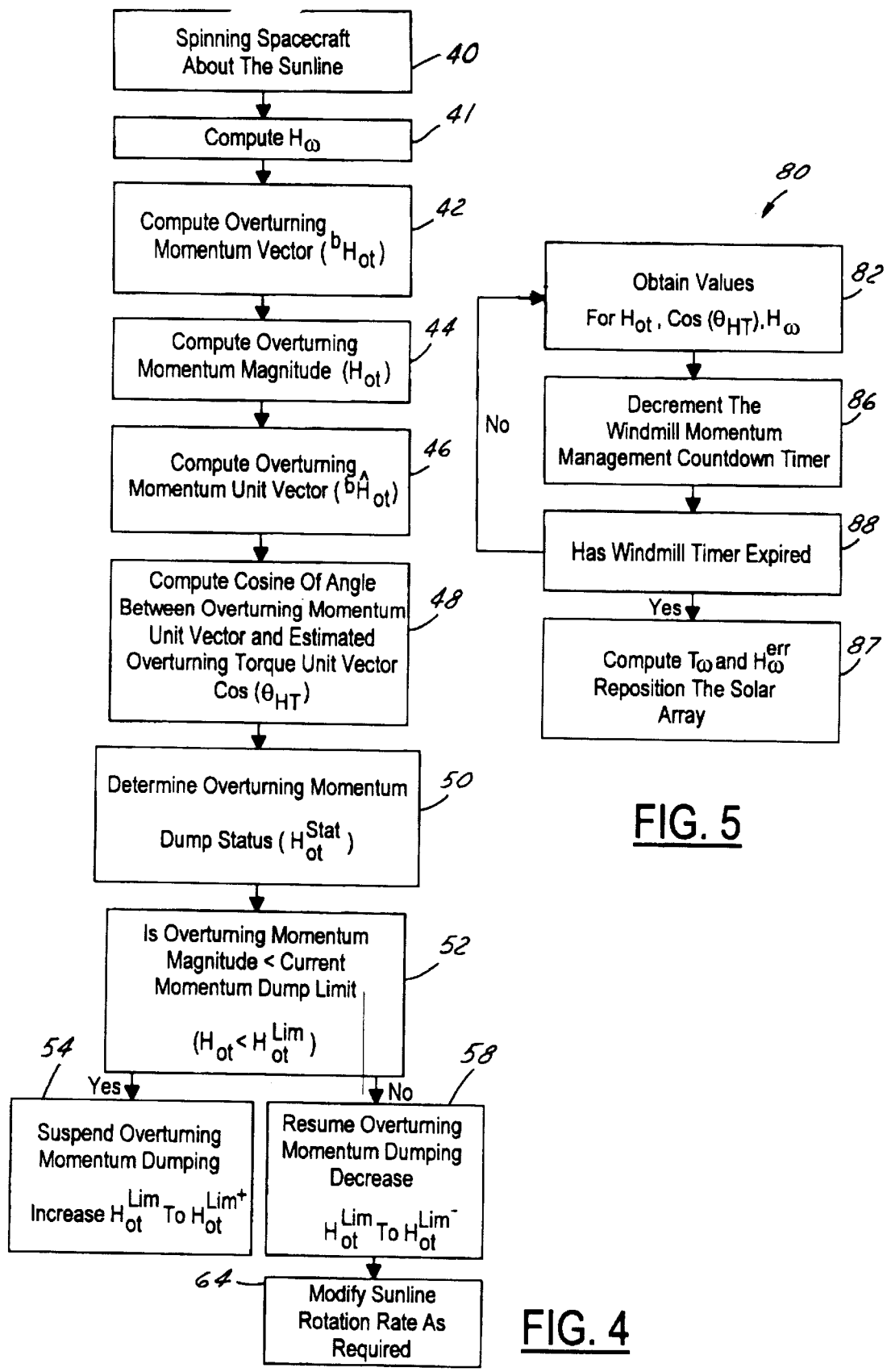

SPACECRAFT MOMENTUM MANAGEMENT SYSTEM

STATEMENT OF GOVERNMENT INTEREST

Portions of the invention set forth herein were developed with Government support. As a result, the United States of America as represented by its various departments and agencies may have certain rights in this patent

TECHNICAL FIELD

The present invention relates to a system for controlling the momentum of a spacecraft. More particularly, the present invention relates to a system for controlling the momentum of an asymmetric spacecraft in a sunhold attitude through a novel momentum unloading technique that does not use thrusters.

BACKGROUND ART

Many current spacecraft are required during missions to autonomously maintain a state that is power, thermal and momentum safe indefinitely in the presence of external disturbances. Indefinite power and thermal safety can be satisfied for a deployed spacecraft by placing it in a sun hold attitude. However, maintaining the spacecraft in a momentum safe state requires some momentum unloading technique.

Many attitude control strategies utilize a reaction wheel system having a limited capacity to store accumulated momentum resulting from solar pressure on a spacecraft. For symmetric spacecraft for which the solar torque is small or for spacecraft which are not required to remain in sun hold for extended periods of time, the accumulation of momentum is not a major concern and therefore, the accumulated momentum will generally not exceed the storage capacity of these reaction wheel systems.

Conversely, for asymmetric spacecraft, such as any spacecraft where instrument field of view requirements drive the spacecraft layout, solar torque can be very large relative to the capacity of the reaction wheel system to store the accumulated momentum. Further, for spacecraft which are required to operate autonomously in sun hold for long periods of time, momentum accumulation is a concern regardless of how well the spacecraft is balanced. In these cases, the accumulated momentum would quickly exceed the capacity of the system. However, it is undesirable to use thrusters to perform frequent momentum unloading operations as this increases operational risk as well as wasting valuable fuel.

Accordingly, a momentum unloading technique for an asymmetric spacecraft which is required to operate autonomously in sun hold for long periods of time without the need for the firing of thrusters would be advantageous.

SUMMARY OF THE INVENTION

It is an object of the present invention to provide a spacecraft that autonomously maintains a state that is power, thermal, and momentum safe indefinitely in the presence of external disturbances.

It is a further object of the present invention to provide a system for an asymmetric spacecraft that allows the spacecraft to operate autonomously in sun hold for long periods of time.

It is yet another object of the present invention to provide a technique for a spacecraft which uses the spacecraft body and appendages as a momentum unloading actuator.

In accordance with the objects of the present invention, a system for managing the momentum of a spacecraft is provided. The spacecraft has one or more solar panels pointed toward the sun. The spacecraft is rotating continuously or intermittently around the sunline. The spacecraft has a sun sensor for determining the location of the sun, a gyroscope for determining the roll, pitch, and yaw rates of the spacecraft, and a suite of tachometers for determining the amount of stored momentum in the reaction wheels. A controller is in communication with the sun sensor, the gyroscope, and the tachometers to determine the position, rate, and momentum of the spacecraft. The controller compares the actual position, rate, and momentum of the spacecraft to the desired position, rate and momentum of the spacecraft. If the controller determines that the position and/or rate are outside of acceptable limits, it adjusts the spacecraft attitude to maintain the sun in the sun sensor field of view in order to keep the solar panels illuminated, which is necessary for spacecraft power and thermal safely. If the controller determines that the total spacecraft momentum is outside acceptable limits, it adjusts the momentum of the spacecraft by manipulating the spacecraft orientation and/or spin rate about the sunline, and/or manipulating the angle of the solar panels.

These and other objects will become apparent from the following detailed description taken in connection with the accompanying drawings.

BRIEF DESCRIPTION OF THE DRAWINGS

FIG. 4 is a flow chart illustrating the overturning momentum management function in accordance with a preferred embodiment of the present invention; and FIG. 5 is a flow chart illustrating the windmill momentum management function in accordance with a preferred embodiment of the present invention.

BEST MODE(S) FOR CARRYING OUT THE INVENTION

Figure 1:
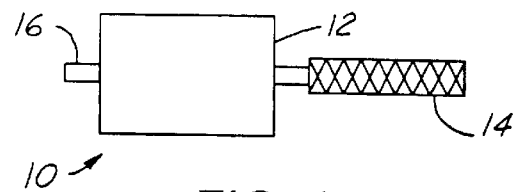
FIG. 1 is a perspective view of an asymmetric spacecraft in accordance with a preferred embodiment of the present invention.

FIG. 1 illustrates a spacecraft 10 in accordance with a preferred embodiment of the present invention. The spacecraft 10 has a spacecraft body 12 and a single solar panel 14 extending from one side of the spacecraft body 12. An instrument 16 such as a camera or other similar device is preferably positioned on the spacecraft body 12 opposite the solar panel 14. Because of the inclusion of the instrument 16, the configuration of the spacecraft 10 is driven by instrument field of view requirements and is therefore asymmetric in design. Because of the asymmetry in the design of the spacecraft 10, large solar torques act on the spacecraft 10 and these torques can quickly exceed the capacity of the reaction wheel system to store such accumulated momentum. It should be understood that the present invention may also be used with symmetric spacecraft.

Figure 2:
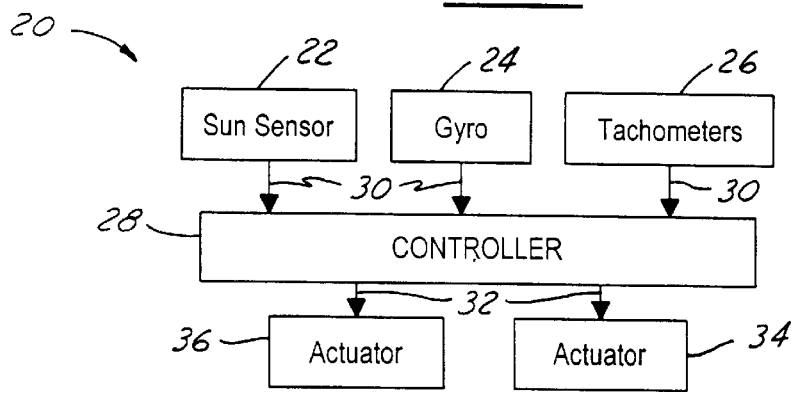
FIG. 2 is a schematic illustration of a control system in accordance with a preferred embodiment of the present invention.

FIG. 2 schematically illustrates a preferred control system 20 in accordance with the present invention. The control system 20 obtains information about the state of the spacecraft 10 using a suite of sensors. The control system 20 includes a sun sensor 22 positioned on the spacecraft 10 to determine the location of the sun. The control system 20 further includes a gyroscope 24 to determine the spin rate of the spacecraft 10 around the roll, pitch, and yaw axes. A series of tachometers 26 is also part of the control system 20 and provides information about the amount of momentum stored in the reaction wheels onboard the spacecraft 10.

The sun sensor 22, the gyro 24, and the tachometers 26 each are in communication with an onboard controller 28 via a respective sensor output signal 30. The controller 28 evaluates the readings from the sensors 22, 24 and 26 and compares the observed state of the spacecraft 10 with its desired state, including desired position, rate, and momentum. If there is a significant difference between the observed state and the desired state, then the controller 28 sends a control signal 32 to one or both of the actuators 34, 36 to drive the system toward the desired state, including changing the speed of the reaction wheels and changing the orientation of the solar array about its axis. Two actuators are shown in the drawings for illustration purposes only, and one of the actuators is preferably a suite of reaction wheels used to control spacecraft body orientation, and the other actuator is preferably a solar array drive used to position the solar array. It should be understood that any number of actuators may be utilized.

In accordance with the momentum control system of the present invention, the spacecraft 10 is placed into a slow rotation about the sunline. It is understood that the spacecraft may be intermittently or continuously rotating about the sunline in accordance with the preferred embodiment. Rotation of the spacecraft about the sunline has the advantage of limiting the longest telemetry and command (T&C) outage between the ground and the spacecraft to a fraction of the spacecraft rotation, and mitigating the accumulation of momentum due to solar pressure. This latter effect is due to the fact that the momentum accumulation is a result of the solar torque acting on the spacecraft being fixed in the body frame, while the spacecraft momentum is fixed in the inertial frame.

In accordance with a preferred embodiment of the present invention, once the spacecraft is rotating around the sunline, it is desired to maintain the spacecraft 10 in a safe sun hold condition indefinitely without operator intervention and without the need to continually fire thrusters. The preferred spacecraft 10 is intended to be asymmetric in design and/or be positioned in a safe sun hold condition indefinitely, so the solar torques are significant and momentum accumulation is a concern. In accordance with the system of the present invention, any spacecraft can remain in sun hold indefinitely without operator intervention and without autonomous firing of thrusters.

In operation, the spacecraft 10 is placed into long-term sun hold with the sun sensor 22 pointed along the sunline. Once rotating about the sunline, the spacecraft 10 is placed into a storage mode. Storage mode also provides onboard support for transitions of the spacecraft into and out of a normal mode and also as it exits an acquisition mode. Normal mode and acquisition mode are well known in the art. The storage mode of the spacecraft 10 implements those functions which are required for the health and safety of the spacecraft in long-term sun hold, or which would be difficult to perform manually from the ground due to T & C limitations. While rotating about the sunline, ground may enable (non-thruster) momentum unloading functions to maintain the spacecraft in a momentum-safe state indefinitely, as described below. Ground may also halt the spacecraft rotation in order to support operations which require an uninterrupted T & C link, as is well known in the art.

In storage mode, all functions that are needed to permit attitude determination and control during long-term sunhold are available, as well as system support functions and ground control of sensors and actuators. However, to minimize ground interaction with the spacecraft during in-orbit storage, the present invention provides a system for managing the momentum of the spacecraft 10 without operator intervention or using thrusters.

Figure 3:
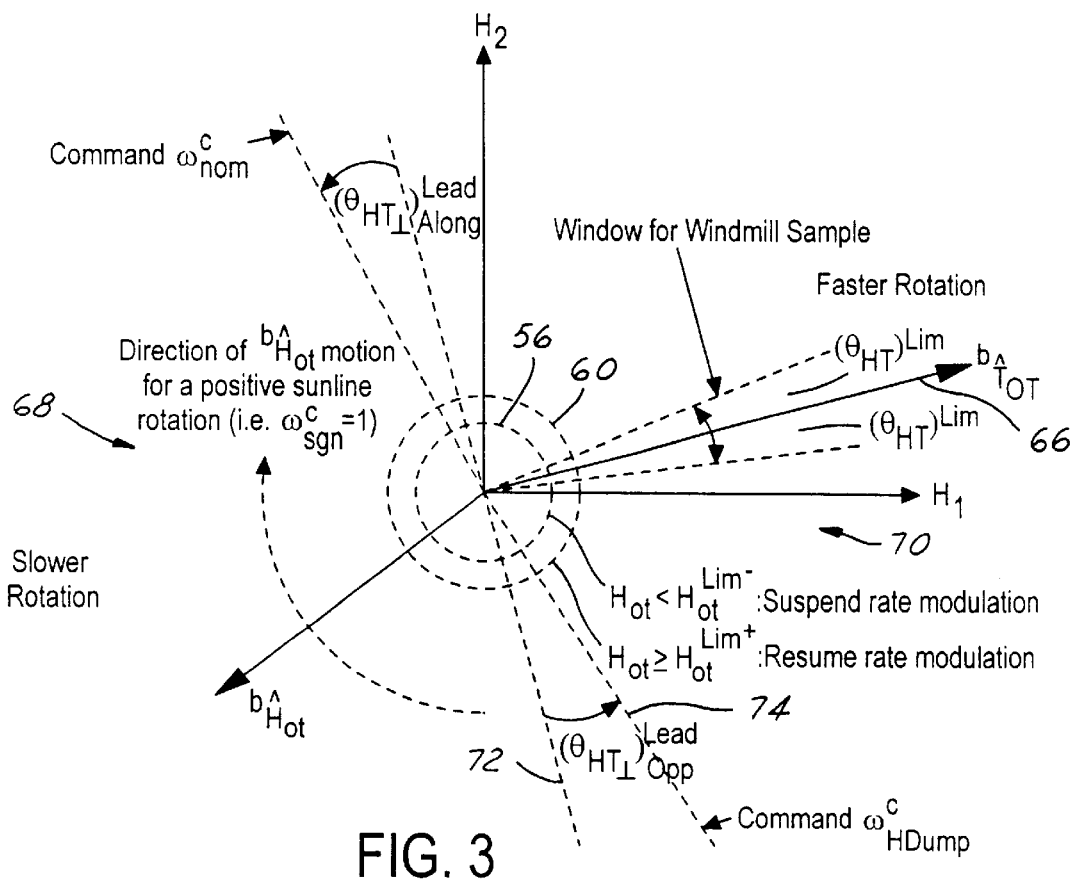
FIG. 3 is a schematic momentum management diagram looking at the sun sensor along the sunline in accordance with a preferred embodiment of the present invention.

The preferred momentum management system is described in the body fixed sun sensor frame, which is nominally aligned with the solar array frame in sunhold and is designated H in FIG. 3. The sun sensor frame "windmill" axis, which is designated by $H_3$, is along the sun sensor boresight pointing outward from the spacecraft body towards the sun, which is directly out of the page. The sun sensor frame "pitch" axis, which is designated by $H_2$ is aligned with solar array axis. The sun sensor frame "overturning" axis, which is designated by $H_1$, forms a right ortho-normal triad with $H_2$ and $H_3$. Collectively, the $H_1$ and $H_2$ axes span a plane referred to as the "overturning" plane.

The preferred momentum management system utilizes two inter-related techniques to control spacecraft momentum. The first technique manages the momentum in the overturning plane ($H_1$, $H_2$) and the second technique manages momentum along the windmill axis ($H_3$). The primary source of momentum build up for the spacecraft 10 is the single panel solar array 14, which causes the overturning momentum to grow in a body-fixed direction approximately along the overturning axis ($H_1$). When the spacecraft 10 is rotating about the sunline, the momentum accumulated over one revolution in the overturning plane is approximately zero. Over time, however, the overturning momentum may drift or storage mode may be entered with an undesirably large initial overturning momentum.

Overturning Momentum Management

Referring specifically to FIGS. 3 and 4, the overturning momentum management function of the preferred system is described. FIG. 3 illustrates a momentum management diagram in accordance with the present invention looking along its sunline at the sun sensor. As described above, the spacecraft 10 is initially spinning about the sunline as generally indicated by reference number 40. While the spacecraft rotates around the sunline, the overturning momentum vector ($^b\vec{H}_{ot}$) is continually calculated, as generally indicated by reference number 42. The overturning momentum vector is computed according to the following equations:

$$H^{raw}_w = \vec{H}^{tot}_{sys} \cdot {}^b\hat{S}^{bs}_{ACSS} \tag{1}$$

$$^b\vec{H}_{ot} = {}^b\vec{H}^{tot}_{sys} - (H^{raw}_w)({}^b\hat{S}^{bs}_{ACSS}) \tag{2}$$

where $^b H^{tot}_{sys}$ is the total system momentum determined from gyro and tachometer readings, $H^{raw}_w$ is the unfiltered windmill momentum magnitude (this is reused in connection with windmill momentum management, as discussed below), and $^b\hat{S}^{bs}_{ACSS}$ is the boresight vector in the body frame. The overturning momentum magnitude is then calculated, as generally indicated by reference number 44. The overturning momentum magnitude ($H_{ot}$) is computed according to the following equation:

$$H_{ot} = \sqrt{{}^b\vec{H}_{ot} \cdot {}^b\vec{H}_{ot}} \tag{3}$$

If the overturning momentum magnitude is greater than or equal to the overturning momentum limit below which an overturning momentum unit vector can not be readily computed, as calculated by the following equation:

$$H_{ot} \geq H^{eps}_{ot} \quad (4)$$

then the overturning momentum unit vector can be computed. The system computes the overturning momentum unit vector ($^b\hat{H}_{ot}$), as generally indicated by 46, as follows:

$$^b\hat{H}_{ot} = {}^b\vec{H}_{ot}/H_{ot} \quad (5)$$

If, however, the overturning momentum magnitude is less than the overturning momentum limit, as determined by the following equation:

$$H_{ot} < H^{eps}_{ot} \quad (6)$$

then the overturning momentum unit vector is set as follows:

$$^b\hat{H}_{ot} = {}^b\hat{T}_{ot} \quad (7)$$

where $^b\hat{T}_{ot}$ is an approximate overturning torque unit vector. As will be seen below, even if the overturning momentum unit vector is small, by assigning the overturning momentum unit vector the value of the approximate overturning torque unit vector, windmill unloading can still occur, as discussed in detail below. The cosine of the angle between the overturning momentum unit vector and the estimated overturning torque unit vector is then computed, as generally indicated by reference number 48, according to the following equation:

$$\cos(\theta_{ht}) = {}^b\hat{H}_{ot} \cdot {}^b\hat{T}_{ot} \quad (8)$$

Based on the calculations determined in equations (1) through (8), the overturning momentum dump status is calculated, as generally represented by reference number 50. The overturning momentum dump status ($H^{stat}_{ot}$) is determined according to the logic described below.

First, the system must determine whether the overturning momentum magnitude ($H_{ot}$) is less than the current momentum dump limit ($H^{lim}_{ot}$), as generally indicated by reference number 52. If $H_{ot} < H^{lim}_{ot}$, and the overturning momentum dump status ($H^{stat}_{ot}$) is not "Suspended" then the system suspends any overturning momentum unloading, as generally indicated by reference number 54. The overturning momentum unloading is suspended by setting:

$$H^{lim}_{ot} = H^{lim+}_{ot}$$

and $$H^{stat}_{ot} = \text{Suspended}$$

The spacecraft state of $H_{ot} < H^{lim-}_{ot}$ is shown by the circle 56 in FIG. 3. At this point, the spacecraft sunline spin rate modulation is suspended—no overturning momentum unloading is required, as the spacecraft overturning momentum magnitude is sufficiently small so as not to be a concern.

If, however, the overturning momentum magnitude is greater than or equal to the current momentum dump limit ($H_{ot} \geq H^{lim}_{ot}$) and the overturning momentum unloading is "Suspended", then the system resumes the overturning momentum function as generally indicated by reference number 58. The overturning momentum unloading resumes by setting:

$$H^{lim}_{ot} = H^{lim-}_{ot}$$

and $$H^{stat}_{ot} = \text{Along}$$

The spacecraft state of $H_{ot} \geq H^{lim+}_{ot}$ is shown by the outer circle 60 in FIG. 3. At this point, spacecraft spin rate modulation resumes—overturning momentum unloading is now required, as the spacecraft overturning momentum is significant.

If the overturning momentum unloading status ($H^{stat}_{ot}$) is not equal to "Suspended", then the rotation rate of the spacecraft 10 is modulated to drive the overturning momentum to zero, as generally indicated by reference number 64. When overturning momentum management is enabled by the system, the controller 28 manages the overturning momentum by modulating the rotation rate of the spacecraft 10, so that it spends more time in attitudes which drive the overturning momentum towards zero and less time in attitudes which drive the overturning momentum away from zero, as discussed in more detail below.

The rotation rate of the spacecraft 10 about the sunline is modulated to drive the overturning momentum towards zero by considering the cosine of the angle between the overturning momentum vector and the torque unit vector.

If $H^{stat}_{ot} = \text{"Opposite"}$ and $\cos(\theta_{ht}) > -(\sin(\theta_{ht1}))^{lead}_{along}$ then the overturning momentum is about to enter the overturning half-space containing the torque vector 66 (FIG. 3). At this point, it is appropriate to command a faster spin rate, by setting:

$$^b\vec{\omega}^c_{b\_s} = \omega^c_{sgn} \cdot \omega^c_{nom} \cdot {}^b\hat{\omega}^c_{c\_s} \quad (9)$$

and $H^{stat}_{ot} = \text{"Along"}$. The variable $\omega^c_{sgn}$ is the sign of the sunline rotation rate with 1=along the windmill axis and −1=opposite windmill axis. The variable $\omega^c_{nom}$ is the nominal sunline rotation rate magnitude for overturning momentum management. The variable $^b\hat{\omega}^c_{b\_s}$ is the rate command unit vector. The variable $^b\hat{\omega}^c_{b\_s}$ is the rate command acted upon by the controller to realize the desired rate, using techniques which are well known in the art.

If $H^{stat}_{ot} = \text{"Along"}$ and $\cos(\theta_{ht}) \leq (\sin(\theta_{ht}))^{lead}_{opp}$, then the momentum is about to exit the overturning half-space containing the torque vector 66 (FIG. 3). At this point it is appropriate to command a slower spin rate, by setting $\omega^c_{Hunload}$:

$$^b\vec{\omega}^c_{b\_s} = \omega^c_{sgn} \cdot \omega^c_{unload} \cdot {}^b\hat{\omega}^c_{b\_s} \quad (10)$$

and $H^{stat}_{ot} = \text{opposite}$. The variable $\omega^c_{unload}$ is the slower sunline rotation rate magnitude for overturning momentum management.

If neither of these conditions is met, the overturning momentum unloading status and associated spin rate command remains unchanged.

For the system to modulate the rotation rate of the spacecraft 10 to drive the momentum towards zero, as discussed above, it is further required that the system have an estimate of the body fixed torque, which may be obtained from gyro and sun sensor readings, and knowledge of the spacecraft momentum state, which may be obtained from gyro and wheel readings. Alternatively, the body fixed torque estimate may be set to a known approximate value. Therefore, as shown in FIG. 3, when the spacecraft 10 is in an attitude with the overturning momentum opposite the torque vector 66, such as in the area represented by reference number 68, the spacecraft spins at a slower spin rate. When the spacecraft is in an attitude with the overturning momentum along the torque vector 66, such as in the area represented by reference number 70, the spacecraft 10 spins at the nominal spin rate.

The two sunline rotation regions in this example are separated by the line 72 which is positioned orthogonal to the torque vector and breaks the plane into halves 68 and 70. Thus, when the overturning momentum is in one-half of the overturning plane, the spacecraft 10 is commanded to spin at the nominal spin rate. When the overturning momentum is in the other half of the overturning plane, the spacecraft 10 is commanded to spin at a slower spin rate. However, in order to ensure proper operation, the commands which initiate the spacecraft spin rate modulation are given at line 74 slightly prior to the spacecraft 10 reaching the line 72. This ensures that the spacecraft 10 is spinning at the proper rate whenever the overturning momentum is in the appropriate half-space.

Alternatively, instead of the modulation occurring by decreasing the spin rate when the overturning momentum is in one-half of the overturning plane with respect to the nominal spin rate in the other half of the overturning plane, other methods may be utilized. For example, the spacecraft may be stopped for a fixed period of time, then rotated for a fixed period of time, instead of rotating with an intermittently varying spin rate. Additionally, instead of dividing the overturning plane into halves, the spin rate may be modulated when the overturning momentum is at various other locations in the overturning plane.

Windmill Momentum Management

The windmill (i.e., the along the sunline) components of torque and momentum are fixed in both the body and inertial frames, and so are unaffected by this approach. However, windmill momentum can also grow over time, and is thus managed by a windmill momentum management function of the preferred system. To manage windmill momentum, the solar array 14 can be offset from sun normal to create a torque which drives the windmill component of momentum toward zero. In the event that knowledge of the solar array position is poor, the change in windmill momentum over a period of time may be used to estimate the array position, so that the offset commands are properly implemented.

When windmill momentum management is enabled, the storage mode manages the windmill momentum by off-pointing the solar array. The windmill momentum management system 80 is schematically shown in FIG. 5. First, the momentum measurement processing, as described above in connection with FIGS. 3 and 4, is performed to update values for (1) the overturning momentum magnitude ($H_{ot}$); (2) the cosine of the angle between the overturning momentum unit vector and the estimated overturning torque unit vector ($\cos(\theta_{ht})$); and (3) the unfiltered windmill momentum magnitude ($H^{raw}_w$). The filtered windmill momentum magnitude is determined according to the following equation:

$$H_w = (1-\alpha) \cdot H_w + \alpha \cdot H^{raw}_w \tag{11}$$

This step of updating these values is generally indicated by reference number 82.

If the windmill momentum management is enabled, then the windmill momentum management countdown timer $\Delta^t_{Prev}$ is decremented by the storage mode sample period, as generally indicated by reference number 86. If the windmill momentum dump is enabled and $\Delta^t_{Prev} < 0$ and $\cos(\theta_{ht}) > (\cos(\theta_{ht}))^{lim}$, then the solar array 14 may be repositioned, as generally indicated by reference number 88. The status of $H^{stat}_w$ is first determined. If $H^{stat}_w = $"Not Ready", then no torque or momentum computation can be performed as no windmill momentum sample is available from the previous iteration. In this case, the windmill management system is initialized by setting:

$$H^{stat}_w = \text{"Ready"}$$

$$\Delta^t_{Prev} = \Delta^t_{sample},$$

and $$H^{prev}_w = H_w.$$

Instead, if $H^{stat}_w = $"Ready", then the windmill torque and momentum computations can be performed. Processing first determines an estimate of the windmill torque based on the change in windmill momentum since the previous sample.

$$T_w = \frac{H_w - H^{prev}_w}{\Delta^t_{Sample} - \Delta^t_{Prev}} \tag{11}$$

The sample timer ($\Delta^t_{Prev}$) and the previous value ($H^{prev}$) are reset:

$$\Delta^t_{Prev} = \Delta^t_{Sample}$$

$$H^{prev}_w = H_w$$

This approach ensures that the windmill momentum is sampled once per revolution when the sunline slew rate has converged to the nominal value.

The windmill momentum error is then computed according to the following:

$$H^{err}_w = H_w - H^{target}_w \tag{12}$$

The value will be positive if the momentum is larger than the target and negative if the momentum is smaller than the target. The array offset command is then determined as follows:

i) If the momentum error magnitude is small $|H^{err}_w| \leq H^{db}_w$, then no offset is required and $\theta^{cmd}_{a\_s} = 0$.

ii) If the momentum error is significant and positive ($H^{err}_w) > (H^{db}_w)$, then a positive array offset is required in order to generate a negative windmill torque and reduce the windmill momentum towards the target so that:

$$\theta^{cmd}_{a\_s} = \theta^{max}_{a\_s}$$

iii) Otherwise, if the momentum error is significant and negative, $(-H^{err}_w) > (H^{db}_w)$, then a negative array offset is required in order to generate a positive windmill torque and increase the windmill momentum towards the target, so that:

$$\theta^{cmd}_{a\_s} = -\theta^{max}_{a\_s}$$

The variable $\theta^{max}_{a\_s}$ is the maximum solar array offset allowed for windmill momentum unloading. If no estimate of the array position is available, it may be determined from $T_w$ as follows:

$$\theta^{est}_{a\_s} = B + M \cdot T_w \tag{13}$$

where B is a bias constant and M is a scale factor. Based on a determination of where the array should be ($\theta^{cmd}_{a\_s}$) and an estimate of where the array is ($\theta^{est}_{a\_s}$), the array is moved to a position in order to eliminate any pointing error, using techniques well known in the art. By adjusting the solar array in this manner, any windmill momentum can be driven towards zero.

While a preferred embodiment of the present invention is shown and described, it is envisioned that those skilled in the art may devise various modifications of the present invention without departing from the spirit and scope of the appended claims.

What is claimed is:

1. A method for managing the momentum of a spacecraft comprising:
   determining the position of the sun;
   sensing the spin rate of the spacecraft;
   sensing the amount of stored momentum to the spacecraft;
   communicating said sun position, said spin rate, and said amount of stored momentum into a controller;
   comparing a desired spacecraft state with an observed state as determined by said controller based on said sun position, said spin rate, and said amount of stored momentum;
   determining whether said spacecraft spin rate is in accordance with said desired state;
   determining whether a position of a solar array attached to said spacecraft is in accordance with said desired state; and
   adjusting said spacecraft spin rate and/or said solar array position without the use of thrusters if either is not in accordance with said desired rate.

2. The method as recited in claim 1, wherein said spacecraft is an asymmetric spacecraft having a single solar array.

3. The method as recited in claim 1, wherein said step of adjusting said spacecraft includes spinning said spacecraft at a nominal spin rate for one portion of a revolution and at a slower speed during a second portion of said revolution to drive any overturning momentum towards zero.

4. The method as recited in claim 3, wherein said spacecraft is spinning at a nominal spin rate when said overturning momentum is within 90° of an estimated torque vector of said spacecraft, and is spinning at said slower speed when said overturning momentum is opposite said torque vector.

5. The method as recited in claim 1, wherein said step of adjusting said spacecraft spin rate only occurs when said spacecraft has an overturning momentum that exceeds a lower limit.

6. The method as recited in claim 1, wherein said step of adjusting said position of said solar array includes:
   sampling windmill momentum periodically when the spacecraft rotation rate is steady.

7. The method as recited in claim 6, wherein the change in said windmill momentum is used to determine an estimate of windmill torque.

8. A system for managing the momentum of a spacecraft having a spacecraft body and a solar panel comprising:
   a sun sensor for determining the location of the sun;
   a gyroscope for determining the roll, pitch and yaw rates of the spacecraft;
   a suite of tachometers for determining the amount of any stored momentum in the spacecraft;
   a controller in communication with said sun sensor, said gyroscope and said tachometers to determine if the spacecraft is in the desired state;
   apparatus for determining any overturning momentum accumulated in said spacecraft; and
   apparatus for determining any windmill momentum accumulated in said spacecraft; and
   apparatus for adjusting said spacecraft to drive said overturning momentum and said windmill momentum towards zero without the use of thrusters whereby the spacecraft can remain in a sunhold attitude indefinitely.

9. The system as recited in claim 8, wherein said spacecraft includes an instrument on said spacecraft which has certain field of view requirements causing said spacecraft to be asymmetric in design.

10. The system as recited in claim 8, wherein said windmill momentum is driven towards zero by changing the angle of said solar panel.

11. The system as recited in claim 8, wherein said overturning momentum is driven towards zero by manipulating said spin rate of the spacecraft.

12. A method for maintaining a spacecraft in a momentum safe state indefinitely, comprising:
   rotating said spacecraft about a sunline;
   monitoring the position of said sun;
   sensing the spin rate of the spacecraft;
   sensing the spin rate of the spacecraft;
   sensing the amount of stored momentum in the spacecraft;
   communicating said sun position, said spin rate, and said amount of stored momentum into a controller;
   monitoring spacecraft momentum in an overturning plane;
   monitoring spacecraft momentum about a windmill axis;
   spinning said spacecraft without the use of thrusters at a slower rate when said overturning momentum is located in half-space of said overturning plane exceeding an estimated spacecraft torque unit vector.

13. The method as recited in claim 12, wherein said step of monitoring overturning spacecraft momentum includes:
   computing an overturning momentum magnitude.

14. The method as recited in claim 13, wherein said step of monitoring said overturning spacecraft momentum further includes:
   comparing said overturning momentum magnitude to a limit.

15. The method as recited in claim 14, wherein when said overturning momentum magnitude exceeds said limit, said system adjusts said spacecraft spin rate by:
   spinning said spacecraft at a slower spin rate when said overturning momentum is located in a half-space of said overturning plane exceeding an estimated spacecraft torque unit vector.

16. The method as recited in claim 15, wherein said spacecraft is spun at a normal spin rate when said overturning momentum is located in said half-space of said overturning plane including in the direction of said torque unit vector.

17. The method as recited in claim 12, wherein when said overturning momentum magnitude is greater than a momentum dump limit, said spacecraft performs overturning momentum dumping.

18. The method as recited in claim 12, wherein said step of spinning said spacecraft includes spinning said spacecraft at a nominal spin rate for one portion of a revolution and at a slower speed during a second portion of said revolution to drive any overturning momentum towards zero.

19. The method as recited in claim 18, wherein said spacecraft is spinning at a nominal spin rate when said overturning momentum is within 90° of an estimated toque vector of said spacecraft and is spinning at said slower speed when said overturning momentum is opposite said torque vector.

* * * * *